US00RE34176E

United States Patent [19]

Skinner et al.

[11] E Patent Number: Re. 34,176

[45] Reissued Date of Patent: Feb. 9, 1993

[54] METHOD AND APPARATUS FOR IMPROVING THE RISE AND FALL TIME OF A VIDEO SIGNAL

[75] Inventors: Kenneth R. Skinner, Jefferson City; James E. Hitchcock, Knoxville, both of Tenn.

[73] Assignee: North American Philips Corporation, New York, N.Y.

[21] Appl. No.: 554,640

[22] Filed: Jul. 17, 1990

Related U.S. Patent Documents

Reissue of:

[64] Patent No.: 4,758,891
Issued: Jul. 19, 1988
Appl. No.: 921,935
Filed: Oct. 20, 1986

[51] Int. Cl.[5] ..... H04N 5/14

[52] U.S. Cl. ..... 358/166; 358/162

[58] Field of Search ..... 358/37, 160, 169, 166, 358/162; 307/263-268; 328/164

[56] References Cited

U.S. PATENT DOCUMENTS

| | | | |
|---|---|---|---|
| 3,800,077 | 3/1974 | Smith | 358/166 |
| 3,980,813 | 9/1976 | Shinkai | 358/162 |
| 4,541,014 | 9/1985 | Yagi | 358/162 |

*Primary Examiner*—John W. Shepperd
*Attorney, Agent, or Firm*—Michael E. Marion

[57] ABSTRACT

The edges of an incoming video signal are sharpened by switching the output furnishing the sharpened signal in sequence first to receive a signal delayed by a greater amount, i.e. a signal which has not as yet undergone transition, and, secondly, to receive a signal delayed by a lesser amount, i.e. one that has already completed the transition. The rise time of the affected edge thus depends only on the time required to switch from one terminal to the next. The same switching sequence is carried out regardless of whether the transition is a negative going or positive going transition.

11 Claims, 2 Drawing Sheets

METHOD AND APPARATUS FOR IMPROVING THE RISE AND FALL TIME OF A VIDEO SIGNAL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to television signal processing and, particularly, to improving the edge transitions, i.e. shortening the rise and fall times of a video signal.

2. Description of the Prior Art

Prior means for improving the edge transitions of video signals include the addition of an enhancement or peaking signal to the original video signal. These enhancement or peaking signals are normally generated through such techniques as taking the first or second derivative of the original video signal, and adding the derivative signal, in an appropriate amount and polarity, to the original video signal. Another technique is to use a transversal filter, such as a tapped delay line; wherein, input, output and tap signals are suitable weighted, signed and combined to produce a "peaked" output signal. Still another technique is use a delay line that is unterminated on its output but terminated on its input. By subtracting the output signal from the input signal, a "peaking" signal is produced that is added in an appropriate amount and polarity to the output signal.

A U.S. Pat. No. 4,414,564 by James Hitchcock employs a non-linear technique for edge enhancement that is different from the present invention.

In order for these methods to achieve significant improvement in the resulting signals rise and fall times of edge transitions, a relatively large amount of enhancement or "peaking" signal must be added to the original video signal. However, this also produces excessive preshoots and overshoots at the edge transitions. In a television system, the white going preshoots and overshoots can cause spot blooming on the CRT display.

SUMMARY OF THE INVENTION

It is an object of the present invention to furnish apparatus for sharpening the edges, i.e. decreasing the transition times from a dark to a light level and vice versa in a received video signal in which such changes take place at varying rates, without adding preshoots or overshoots to the resultant signal.

It is a further object of the present invention to carry out this objective with a minimum of additional circuitry in a reliable fashion.

According to the present invention, the first and second derivatives of the incoming signal are generated, and the so generated derivatives are multiplied to each other to generate a control signal.

The incoming signal is also subjected to a first and second time delay. A switching circuit operative under control of the control signal normally connects the signal at the output of the first time delay to the circuit output. In response to the control signal, the circuit output is first connected to the output of the second time delay, next to the signal directly as received and finally back to the signal at the output of the first time delay.

The second time delay exceeds the first time delay and, preferably, is equal to twice the first time delay. The sharpening of the edges thus occurs because the transition is delayed until th directly received video signal has completed the transition. At this point the signal output is switched to the direct input, causing a sharp transition. After the final value of the transition has been stabilized, the signal output is switched back to the output of the first time delay where it remains until the next subsequent transition takes place.

In a preferred embodiment of the invention, the control signal is derived by multiplying the first and second derivatives of the incoming signal to each other and amplitude limiting the resulting signal.

The invention will be described in detail with reference to the accompanying drawing, in which.

DESCRIPTION OF THE PREFERRED EMBODIMENTS

Figure 1:
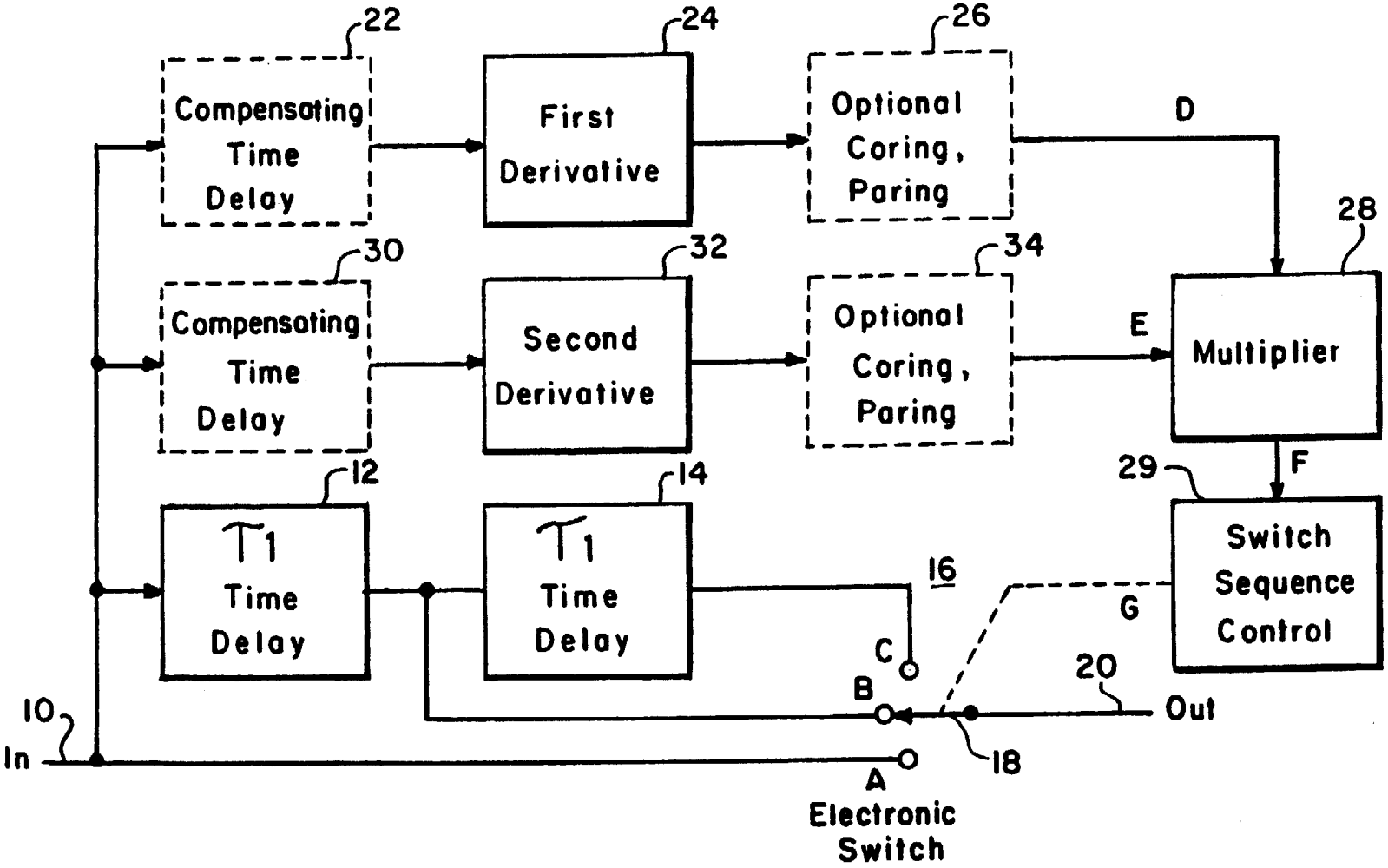
FIG. 1 is a block diagram of the circuit of the present invention.

An increase in the perceived sharpness of a television picture is achieved by use of the circuit illustrated in block diagram form in FIG. 1. It will be shown that the rise or fall times of an edge transition in a video signal are substantially reduced by use of the inventive circuitry, without creating preshoot or overshoot in the resulting waveform.

Referring now to FIG. 1, the baseband video input signal is applied to input terminal 10. It is delayed in a first time delay 12. The output of time delay 12 is connected to the input of a second time delay 14. Selector switch 16 has three input terminals denoted by A, B and C, respectively. The incoming video signal is applied to terminal A, the output of time delay 12 is connected to terminal B, while the output of time delay 14 is connected to terminal C. A selector arm 18 selectively connects one of the above-mentioned input terminals to an output terminal 20.

The incoming video signal is also connected through a compensating time delay 22 to a circuit 24 for deriving the first derivative. After optional coring and/or paring in a processing stage 26, the first derivative signal is applied to one input of a multiplier 28. The baseband video signal is also applied through a second compensating time delay 30 to a second derivative network 32. The output of second derivative network 32 is connected through an optional coring and paring stage 34 to a second input of multiplier 28. The output of multiplier 28 furnishes the switch control signal which operates selector arm 18 of switch 16.

Figure 2:
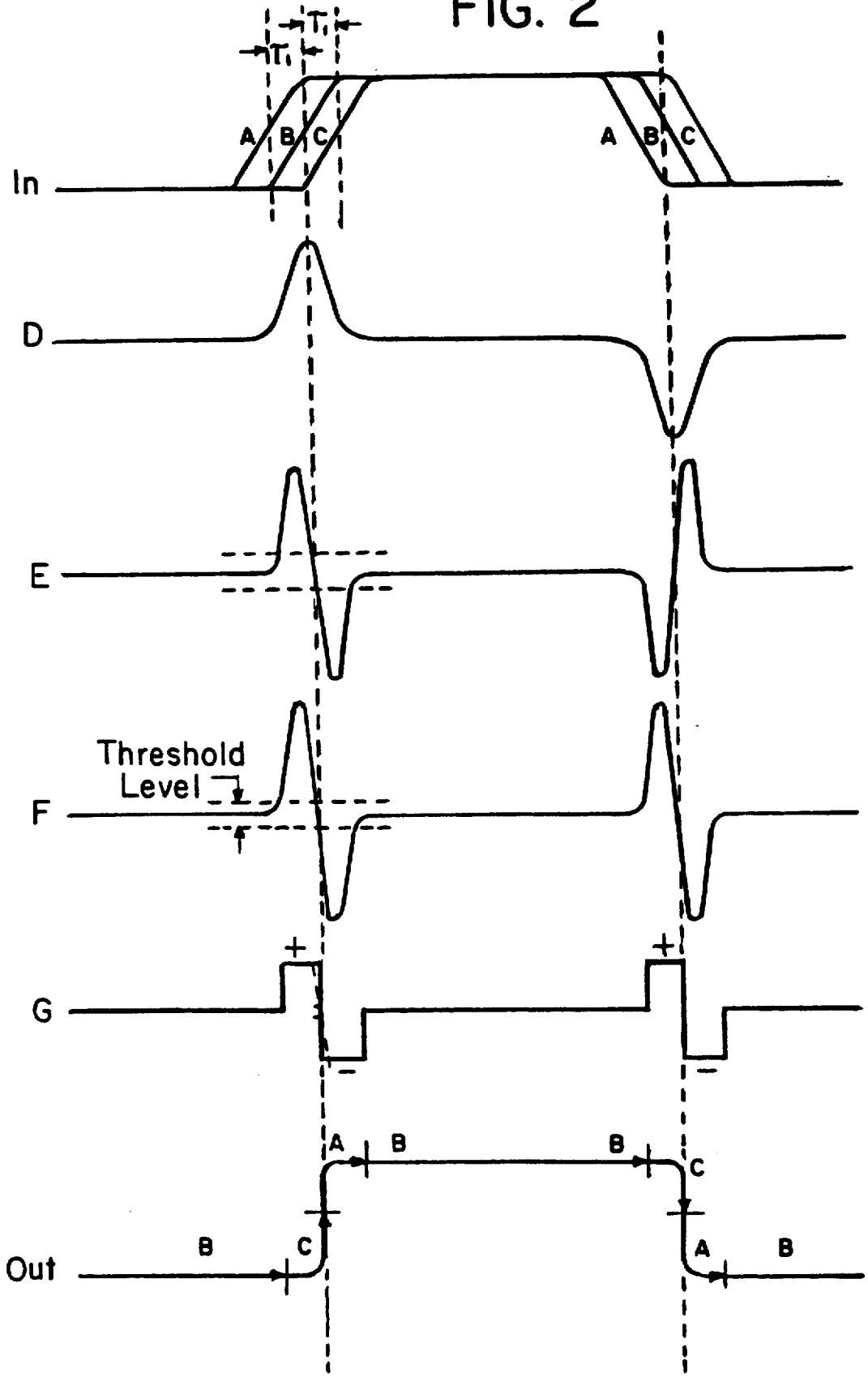
FIG. 2 shows the waveforms at selected parts of the circuit of FIG. 1.

The operation of the above-described circuits will now be explained with reference to FIG. 2. Incoming signal A is illustrated in line 1 of FIG. 2 as undergoing transitions between a first and a second level. Signal B is signal A delayed by a time delay $\tau_1$ while signal C is delayed by a time delay $\tau_2=\tau_1$ relative to incoming signal A. The first transition illustrated in line 1 is a transition from a lower to a higher level. A change in the opposite direction, i.e. from the higher level back to the lower level is also illustrated. It is one advantage of the present invention that both transitions can be processed in the same manner with the same switching sequence.

In Line 2, the signal D at the output of the optional coring and paring circuit 26 is illustrated. It will be noted that in the illustrated embodiment compensating time delay 22 is chosen so that overall time delay from input to point D is equal to the time delay of stage 12.

Similarly, the second derivative signal is illustrated in line 3. Again, the compensating time delay of unit 30 is chosen so that the overall time delay from input to point E is the same as the time delay $\tau_1$ of unit 12. No coring or paring is illustrated in FIG. 2 for signals D and E. However, either or both of these signals could be subjected to coring, i.e. a threshold stage could be provided which yields no output until such time as the magnitude of either one or the other of these signals, or both, exceeds a predetermined minimum amplitude. This is indicated by dashed lines in lines 2 and 3. Paring, i.e. amplitude limiting may also be provided.

The signal F, namely the signal at the output of multiplier 28, is illustrated in line 4. Here a threshold level as indicated is important, since it is not intended that the switch sequence control circuit 29 become operative until a transition having a minimum transition amplitude occurs.

Signal G, the actual switch sequence control signal is illustrated in line 5. It will be noted that this signal represents signal F after amplitude limiting and coring, i.e. provision of the threshold level. The resulting substantially rectangular signal will cause the switch sequence control signal G to switch moveable arm 18 from terminal C to terminal A.

The signal output at terminal 20 is illustrated in line 6. Signal B, the signal delayed by delay unit 12 but not by delay unit 14, constitutes the output in the absence of any transition, independent of the actual input signal level. When the signal G is positive, connection is made from output 20 to terminal C, for example by switching a transistor connecting the two points to a fully conductive state. The output signal then is the signal with the most delay, namely the delay through both units 12 and 14. This signal has not as yet commenced its transition. However, when signal G is negative, the connection from terminal C to the output terminal 20 is broken, while that from terminal A is established. The direct input signal, namely the signal at terminal A has already completed its transition. The signal at terminal 20 therefore undergoes its transition in the time required for the change in the switch connections. Comparison of line 6 to line 1 of FIG. 2 will show that this results in a substantial sharpening of the leading edge of the waveform.

At the end of the transition, when the new level has been established, the circuit returns to its equilibrium position, namely the output terminal is connected to terminal B. When this transition takes place, the signal at terminal A has already reached the new level. There is thus no transient introduced.

The established level is maintained until a decrease of the input signal A occurs. Exactly the same switching sequence is followed as was the case for an increasing level. Output terminal 20 is first switched to the signal having a greater delay, so that the original level is maintained. It is then switched to the signal having the least delay, that signal having already completed the transition. Again, the transition takes place in the extremely short time required to switch from terminal C to terminal A. After the new level has been established at terminal A, the circuit is switched back to terminal B where it remains until the next transition takes place.

Although the present invention has been described with reference to a particularly preferred embodiment, other embodiments and variations of the present embodiment will be clearly evident to one skilled in the art. Such variations and embodiments are to be included in the scope of the invention as set forth in the following claims.

What is claimed:

1. Apparatus for generating an output signal having decreased transition times in response to a received video signal having varying rates of change, comprising first means for receiving said video signal and generating a first derivative signal varying in correspondence to said varying rates of change;

second means connected to said first means for generating a switch control signal varying at least in part in response thereto;

time delay means connected to receive said video signal for generating a first and second time delayed signal corresponding to said video signal delayed by a first and second time delay, respectively;

and switch means having a control input connected to receive said switch control signal, a signal output, a first, second and third signal input for receiving said video signal, said first time delayed signal and said second time delayed signal, respectively, and control means for normally connecting said signal output to said second signal input and for connecting said signal output to said third signal input and said first input under control of said switch control signal.

2. Apparatus as set forth in claim 1, wherein said control means connects said signal output to said third signal input, said first signal input and back to said second signal input in response to said control signal.

3. Apparatus as set forth in claim 1, wherein said second means comprises third means connected to receive said video signal for generating a second derivative signal corresponding to the second derivative thereof, and multiplier means connected to said first means and said third means for multiplying said first derivative signal by said second derivative signal, thereby generating said switch control signal.

4. Apparatus as set forth in claim 2, further comprising coring and paring means interconnected between said first and third means, respectively, and said multiplier means.

5. Apparatus as set forth in claim 1, wherein said time delay means comprises first delay means connected to receive said video signal for furnishing said first time delayed signal in response thereto, and second delay means connected to said first delay means at a common point for receiving said first time delayed signal and generating said second time delayed signal in response thereto;

further comprising means for connecting said common point to said second signal input said second time delay means to said third signal input and said first signal input to receive said video signal.

6. Apparatus as set forth in claim 1, wherein said second time delay is equal to two times said first time delay.

7. A method for furnishing at an output terminal a video output signal having shorter transition times when changing from a first to a second level than corresponding transition times in a received video signal, comprising the steps of delaying said incoming video signal by a first time delay and a second time delay exceeding said first time delay, thereby generating a first and second time delayed signal, respectively;

applying said first time delayed signal to said output terminal to constitute said video output signal in the absence of a transition and alternatively applying said second time delayed signal and said received video signal in sequence to said output terminal to constitute said video output signal before said second time delayed signal has started said transition and following completion of said transition by said received video signal, respectively.

8. A method as set forth in claim 7, wherein said step of applying and alternatively applying comprises generating a transition signal indicative of said transition in a selected one of said video signals and applying said first time delayed signal to said output terminal in the absence of said transition signal and said second time delayed and received video signal in sequence in response to said transition signal.

9. A method as set forth in claim 8, wherein said transition is a positive going transition.

10. A method as set forth in claim 8, wherein said transition is a negative going transition.

*11. Apparatus for generating an output signal having decreased transition times in response to a received video signal having varying rates of change, comprising:*

*first means for receiving said video signal and generating a second derivative signal therefrom;*

*second means connected to said first means, for generating a control signal varying at least in part, in response thereto;*

*time delay means connected to receive said video signal, for generating a time delayed signal corresponding to said video signal; and*

*output means coupled to receive said video signal and said time delayed signal, said output means having a control input connected to receive said control signal and a signal output for furnishing said output signal.*

* * * * *